(12) United States Patent
Collison

(10) Patent No.: US 12,251,913 B2
(45) Date of Patent: *Mar. 18, 2025

(54) MULTILAYER FLOORING INCLUDING FIBER CORE LAYER

(71) Applicant: MP Global Products, L.L.C., Norfolk, NE (US)

(72) Inventor: Alan B. Collison, Pierce, NE (US)

(73) Assignee: MP Global Products, L.L.C., Norfolk, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/746,200

(22) Filed: Jun. 18, 2024

(65) Prior Publication Data

US 2024/0336049 A1 Oct. 10, 2024

Related U.S. Application Data

(63) Continuation-in-part of application No. 18/496,725, filed on Oct. 27, 2023, now Pat. No. 12,044,015.

(Continued)

(51) Int. Cl.
*B32B 29/00* (2006.01)
*B32B 29/02* (2006.01)

(52) U.S. Cl.
CPC .......... *B32B 29/02* (2013.01); *B32B 2255/02* (2013.01); *B32B 2255/20* (2013.01); *B32B 2255/26* (2013.01); *B32B 2262/0253* (2013.01); *B32B 2262/0261* (2013.01); *B32B 2262/0284* (2013.01); *B32B 2262/12* (2013.01);

(Continued)

(58) Field of Classification Search
CPC .......... E04F 15/02033; E04F 15/02038; E04F 15/107; E04F 15/102; E04F 2201/042; E04F 2201/0107; E04F 15/18; E04F 2201/03; E04F 2201/0552; E04F 2201/023; E04F 2201/0535; E04F 2201/0146; E04F 2201/043; E04F 2201/0547; E04F 2201/0153; E04F 2201/0138; B32B 37/00; B32B 29/02; B32B 2307/7376; B32B 2255/02; B32B 2255/20; B32B 2255/26; B32B 2260/021; B32B 2262/0261; B32B 2262/0284; B32B 2262/12; B32B 2307/554; B32B 2307/7265

See application file for complete search history.

(56) References Cited

U.S. PATENT DOCUMENTS 10,094,126 B2  10/2018  Collison et al.
10,460,715 B2  10/2019  Bush et al.
(Continued)

FOREIGN PATENT DOCUMENTS

WO   2014070704 A1   5/2014
WO   2018195002 A1   10/2018

*Primary Examiner* — Chi Q Nguyen
(74) *Attorney, Agent, or Firm* — Harness, Dickey & Pierce, P.L.C.

(57) ABSTRACT

A multilayer flooring includes a decorative layer and a core layer. The decorative layer is configured to provide a desired appearance of the multilayer flooring. The core layer is disposed below the decorative layer and is configured to provide stability. The core layer is made of a substrate fiber bound together by a thermoplastic binder fiber. The substrate fiber includes cellulose fiber and/or synthetic fiber. The thermoplastic binder fiber includes a bicomponent fiber.

19 Claims, 1 Drawing Sheet

Related U.S. Application Data

(60) Provisional application No. 63/424,274, filed on Nov. 10, 2022.

(52) U.S. Cl.
CPC . *B32B 2307/554* (2013.01); *B32B 2307/7265* (2013.01); *B32B 2307/7376* (2023.05)

(56) References Cited

U.S. PATENT DOCUMENTS

| | | |
|---|---|---|
| 11,668,106 B2 | 6/2023 | D'Hondt et al. |
| 11,850,829 B2 | 12/2023 | Ziegler et al. |
| 12,044,015 B2 * | 7/2024 | Collison ............... E04F 15/102 |
| 2003/0211291 A1 * | 11/2003 | Castiglione ............ B64D 13/00 |
| | | 428/167 |
| 2004/0002274 A1 | 1/2004 | Tilton |
| 2008/0121461 A1 | 5/2008 | Gross et al. |
| 2009/0155612 A1 | 6/2009 | Pervan et al. |
| 2010/0021718 A1 | 1/2010 | Vos et al. |
| 2012/0276348 A1 | 11/2012 | Clausi et al. |
| 2015/0086747 A1 * | 3/2015 | Beuchel ............... B32B 37/1207 |
| | | 428/480 |
| 2015/0197943 A1 | 7/2015 | Ziegler et al. |
| 2016/0083965 A1 * | 3/2016 | Baert .................. B29C 65/4805 |
| | | 52/309.1 |
| 2016/0369507 A1 | 12/2016 | Pervan et al. |
| 2017/0298639 A1 * | 10/2017 | Song ....................... B32B 21/08 |
| 2018/0283014 A1 * | 10/2018 | Hodgkins ............. E04F 15/105 |
| 2019/0210329 A1 | 7/2019 | Ziegler et al. |
| 2021/0046742 A1 * | 2/2021 | Rosbrook ............... B32B 27/22 |
| 2023/0013455 A1 | 1/2023 | Ziegler et al. |
| 2023/0183527 A1 | 6/2023 | Clement et al. |
| 2023/0243162 A1 | 8/2023 | Collison et al. |
| 2023/0321961 A1 * | 10/2023 | Coquelle ................. B32B 5/024 |
| | | 428/515 |
| 2024/0093506 A1 | 3/2024 | De Rick et al. |
| 2024/0247498 A1 * | 7/2024 | Boucke et al. ... E04F 15/02038 |
| 2024/0259065 A1 * | 8/2024 | Bhat .................... H04B 7/0626 |

* cited by examiner

MULTILAYER FLOORING INCLUDING FIBER CORE LAYER

CROSS-REFERENCE TO RELATED APPLICATIONS

This application is a continuation-in-part of U.S. Nonprovisional application Ser. No. 18/496,725, filed on Oct. 27, 2023, now U.S. Pat. No. 12,044,015, which claims the benefit of U.S. Provisional Application No. 63/424,274, filed on Nov. 10, 2022. The entire disclosure of each of the applications referenced above is incorporated herein by reference.

FIELD

The present disclosure relates to multilayer flooring including a fiber core layer.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Multilayer flooring has become a viable alternative to hardwood flooring, or solid wood flooring, due to reduced cost, water resistance, and less maintenance. Three types of multilayer flooring are laminate flooring, vinyl flooring, and engineered wood flooring. Vinyl flooring includes luxury viny plank (LVP) and luxury vinyl tile (LVT).

Multilayer flooring typically includes a decorative layer and a core layer. The decorative layer provides the desired appearance of a floor such as that of hardwood flooring. The core layer is disposed below the decorative layer and provides stability, durability and, in some cases, water resistance. Some types of multilayer flooring also include a wear layer disposed above the decorative layer and/or a backing layer disposed below the core layer. The wear layer is typically transparent, protects the floor against scratches and stains, and, in some cases, minimizes damage from exposure to ultraviolet rays. The backing layer provides additional stability and/or water resistance.

In laminate flooring, the core layer is typically made of melamine resin and fiberboard. In vinyl flooring, the core layer is typically made of wood plastic composite (WPC), stone plastic composite (SPC), or polyvinyl chloride (PVC). In engineered wood flooring, the core layer is typically made of plywood, medium-density fiberboard (MDF), or high-density fiberboard (HDF).

Multilayer flooring including a core layer made of the materials listed above is heavy and provides minimal sound reduction and thermal insulation. In addition, such multilayer flooring may not be as rigid as desired. Furthermore, some of the materials listed above, such as plywood, have increased in price and decreased in availability.

SUMMARY

An example of multilayer flooring according to the present disclosure includes a decorative layer and a core layer. The decorative layer is configured to provide a desired appearance of the multilayer flooring. The core layer is disposed below the decorative layer and is configured to provide stability. The core layer is made of a substrate fiber bound together by a thermoplastic binder fiber. The substrate fiber includes cellulose fiber and/or synthetic fiber. The thermoplastic binder fiber includes a bicomponent fiber.

In one aspect, the thickness of the multilayer flooring is within a range from 15 millimeters (mm) to 22 mm, and the decorative layer is made of wood, WPC, SPC, MDF, HDF, or combinations thereof.

In one aspect, the multilayer flooring further includes a wear layer disposed above the decorative layer configured to protect the multilayer flooring against at least one of scratches and stains.

In one aspect, the thickness of the multilayer flooring is within a range from 6 mm to 12 mm, the decorative layer is made of paper, and the wear layer is made of aluminum oxide.

In one aspect, the thickness of the multilayer flooring is within a range from 2 mm to 8 mm, the decorative layer is made of paper, and the wear layer is made of urethane.

In one aspect, the multilayer flooring further includes a backing layer disposed below the core layer and configured to provide at least one of additional stability and water resistance.

In one aspect, the backing layer is made of melamine, fiberglass, wood, WPC, SPC, MDF, HDF, or combinations thereof.

In one aspect, the bicomponent fiber includes a core and a sheath surrounding the core, the core is made of polypropylene (PP) or polyethylene terephthalate (PET), and the sheath is made of polyethylene (PE) or copolymerized PET (co-PET).

In one aspect, the substrate fiber includes an acrylic fiber.

In one aspect, the substrate fiber consists of at least one of PET fibers, PP fibers, and nylon fibers.

An example of a floor structure according to the present disclosure includes a multilayer flooring, a flooring underlayment configured to provide a smooth surface that supports the multilayer flooring, and a subfloor configured to provide a firm surface that supports the flooring underlayment and the multilayer flooring. The multilayer flooring includes a decorative layer and a core layer. The decorative layer is configured to provide a desired appearance of the multilayer flooring. The core layer is disposed below the decorative layer and is configured to provide stability. The core layer is made of a substrate fiber bound together by a thermoplastic binder fiber. The substrate fiber includes cellulose fiber and/or synthetic fiber. The thermoplastic binder fiber includes a bicomponent fiber.

In one aspect, the thickness of the multilayer flooring is within a range from 15 mm to 22 mm, and the decorative layer is made of wood, WPC, SPC, MDF, HDF, or combinations thereof.

In one aspect, the multilayer flooring further includes a wear layer disposed above the decorative layer configured to protect the multilayer flooring against at least one of scratches and stains.

In one aspect, the thickness of the multilayer flooring is within a range from 6 mm to 12 mm, the decorative layer is made of paper, and the wear layer is made of aluminum oxide.

In one aspect, the thickness of the multilayer flooring is within a range from 2 mm to 8 mm, the decorative layer is made of paper, and the wear layer is made of urethane.

In one aspect, the multilayer flooring further includes a backing layer disposed below the core layer and configured to provide at least one of additional stability and water resistance, and the flooring underlayment is attached to an underside surface of the backing layer.

In one aspect, the backing layer is made of melamine, fiberglass, wood, WPC, SPC, MDF, HDF, or combinations thereof.

In one aspect, the bicomponent fiber includes a core and a sheath surrounding the core, the core is made of PP or PET, and the sheath is made of PE or co-PET.

In one aspect, the substrate fiber includes an acrylic fiber.

In one aspect, the substrate fiber consists of at least one of PET fibers, PP fibers, and nylon fibers.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A multilayer flooring according to the principles of the present disclosure includes a fiber core layer made of substrate fibers bound together by thermoplastic binder fibers. In one example, the substrate fibers include synthetic fibers such as acrylic fibers and/or thermoplastic fibers (e.g., PET fiber, PP fiber, and/or nylon fiber). In another example, the substrate fibers include cellulose fibers such as hemp fibers, cotton fibers, denim fibers, and/or paper fibers. The thermoplastic binder fibers may be bicomponent fibers with, for example, a PP or PET core and a PE or copolymerized PET (co-PET) sheath surrounding the PP or PET core.

The fiber core layer enables the multilayer flooring to have improved rigidity, sound reduction, and thermal insulation relative to a multilayer flooring having a core layer made of WPC, SPC, PVC, plywood, MDF, or HDF. In addition, for a given thickness, the fiber core layer is lighter and may cost less than a core layer made of WPC, SPC, PVC, plywood, MDF, or HDF. Furthermore, the materials of the fiber core layer may be less expensive and more available than WPC, SPC, PVC, plywood, MDF, and/or HDF. Moreover, the fiber core layer may be made entirely of recycled materials and may be 100 percent (%) recyclable.

Figure 1:
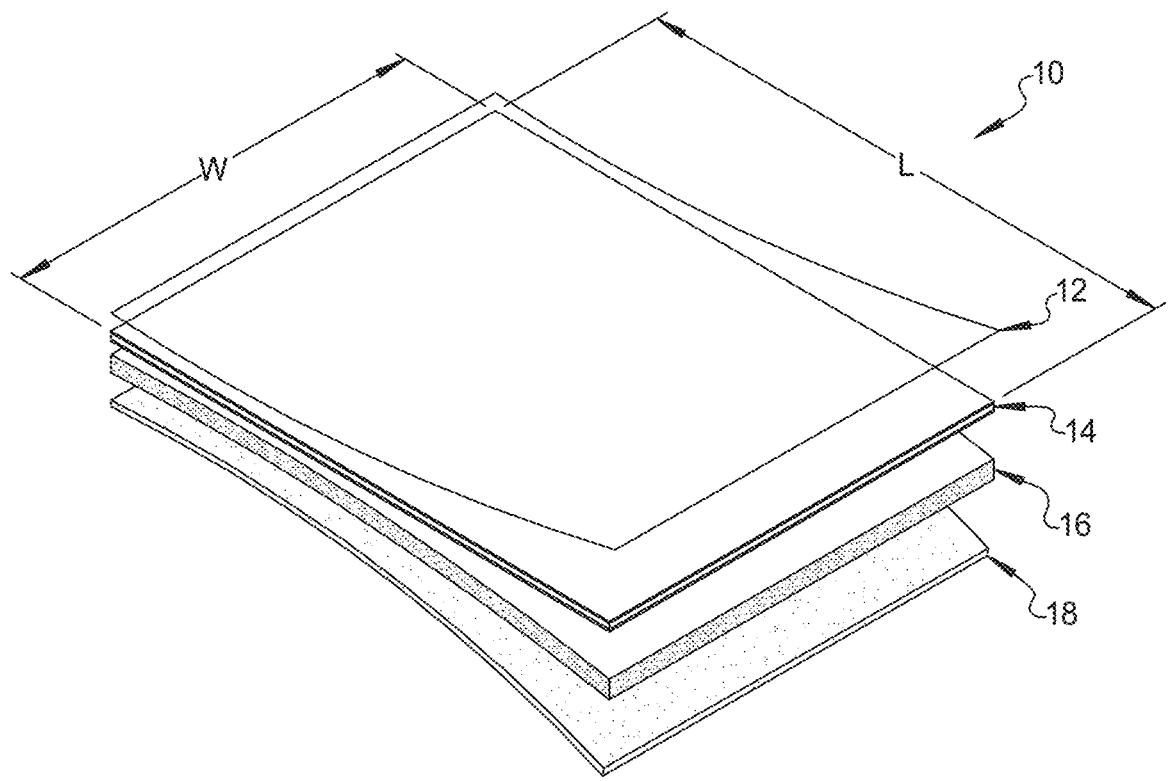
FIG. 1 is an exploded perspective view of an example multilayer flooring including a fiber core layer according to the principles of the present disclosure.
Figure 2:
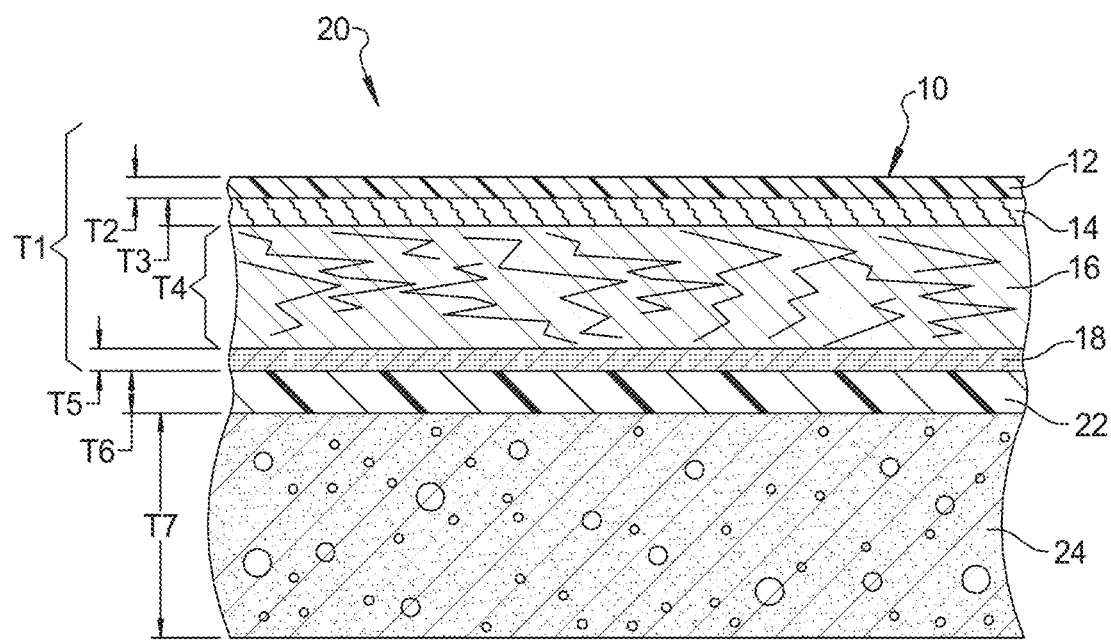
FIG. 2 is a section view of a floor structure including the multilayer flooring of FIG. 1 installed on top of flooring underlayment and a subfloor.

Referring now to FIGS. 1 and 2, a multilayer flooring 10 according to the present disclosure includes a wear layer 12, a decorative layer 14, a substrate or core layer 16, and a backing layer 18. The multilayer flooring 10 has a structure similar or identical to laminate flooring, vinyl flooring (e.g., LVP or LVT), or engineered wood flooring except for the core layer 16. Instead of being made from a material such as WPC, SPC, PVC, plywood, MDF, or HDF, the core layer 16 is made of substrate fibers bound together by thermoplastic binder fibers. The dimensions (e.g., thickness) and geometry (e.g., cross-sectional shape) of the core layer 16 may also be adjusted to account for differences in its material properties relative to conventional core layers. The wear layer 12, the decorative layer 14, the core layer 16, and/or the backing layer 18 may be joined to one another using adhesive.

The multilayer flooring 10 has a width W, a length L, and a thickness T1. If the multilayer flooring 10 has a structure similar to laminate flooring, its thickness T1 may be within a range from 6 mm to 12 mm. If the multilayer flooring 10 has a structure similar to laminate plank flooring, its width W may be within a range from 12 centimeters (cm) to 30 cm and its length L may be within a range from 115 cm to 150 cm.

If the multilayer flooring 10 has a structure similar to vinyl flooring, its thickness T1 may be within a range from 2 mm to 8 mm. If the multilayer flooring 10 has a structure similar to vinyl plank flooring, its width W may be within a range from 10 cm to 30 cm and its length L may be within a range from 90 cm to 122 cm. If the multilayer flooring 10 has a structure similar to engineered wood flooring, its width W may be within a range from 8 cm to 30 cm, its length L may be within a range from 90 cm to 185 cm, and its thickness T1 may be within a range from 15 mm to 22 mm.

The wear layer 12 is transparent, protects a floor against scratches and stains, and may minimize damage to the floor from exposure to ultraviolet (UV) rays. In various implementations, the multilayer flooring 10 may include a UV layer that is separate from and disposed above the wear layer 12 and is also transparent. In these implementations, the UV layer minimizes damage to the floor from exposure to UV rays, and the wear layer 12 protects a floor against scratches and stains. The wear layer 12 has a thickness T2. If the multilayer flooring 10 has a structure similar to laminate flooring, the wear layer 12 may be made of aluminum oxide. If the multilayer flooring 10 has a structure similar to vinyl flooring, the wear layer 12 may be made of urethane (e.g., a urethane-based coating). If the multilayer flooring 10 has a structure similar to laminate or vinyl flooring, the thickness T2 of the wear layer 12 may be within a range from 4 mils to 40 mils. If the multilayer flooring 10 has a structure similar to engineered wood flooring, the wear layer 12 may be omitted and the decorative layer 14 may be referred to as a wear layer.

The decorative layer 14 is disposed below the wear layer 12 and provides the desired appearance of a floor such as the appearance of hardwood flooring. The decorative layer 14 has a thickness T3. If the multilayer flooring 10 has a structure similar to laminate or vinyl flooring, the decorative layer 14 may be made of paper, and the desired appearance of the multilayer flooring 10 may be printed on the paper. If the multilayer flooring 10 has a structure similar to engineered wood flooring, the decorative layer 14 may be made of wood, WPC, SPC, MDF, and/or HDF, may be referred to as a veneer layer, and its thickness T3 may be within a range from 0.4 mm to 4 mm. In one example, the thickness T3 of the decorative layer 14 is within a range from 3 mm to 4 mm or 4.5 mm.

The backing layer 18 is disposed below the core layer 16 and provides additional stability and/or water resistance. The backing layer 18 has a thickness T4. If the multilayer flooring 10 has a structure similar to laminate flooring, the backing layer 18 may be made of melamine. If the multilayer flooring 10 has a structure similar to vinyl flooring, the backing layer 18 may be made of fiberglass. If the multilayer flooring 10 has a structure similar to laminate or vinyl flooring, the thickness T4 of the backing layer 18 may be within a range from 3 mm to 5 mm. If the multilayer flooring 10 has a structure similar to engineered wood flooring, the backing layer 18 may be made of wood, WPC, SPC, MDF, and/or HDF (e.g., the same material as the decorative layer 14) and its thickness T4 may be within a range from 0.4 mm to 4 mm (e.g., the same thickness as the decorative layer 14). In one example, the thickness T4 of the backing layer 18 is within a range from 2 mm to 2.5 mm or 3 mm. Alternatively, if the multilayer flooring 10 has a structure similar to laminate flooring, vinyl flooring, or engineered wood flooring, the backing layer 18 may be omitted.

The core layer 16 is disposed below the decorative layer 14 and provides stability (e.g., firmness) and durability. The core layer 16 has a thickness T5. If the multilayer flooring 10 has a structure similar to laminate or vinyl flooring, the thickness T5 of the core layer 16 may be within a range from 2 mm to 8 mm. In one example, the thickness T5 of the core layer 16 is within a range from 5 mm to 6 mm. If the multilayer flooring 10 has a structure similar to engineered wood flooring, the thickness T5 of the core layer 16 may be within a range from 12 mm to 14 mm.

As noted above, the core layer 16 is made of substrate fibers bound together by thermoplastic binder fibers. The substrate fibers may include synthetic fibers such as acrylic fibers and/or thermoplastic fibers (e.g., PET fibers, PP fibers, and/or nylon fibers). In one example, all the substrate fibers are PET fibers, PP fibers, and/or nylon fibers. The PET fibers may have a linear density within a range between 2 denier (den) and 6 den. The PET fibers may have a length within a range from 1 inch to 1.5 inches. Using fiber types other than PET fibers, PP fibers, or nylon fibers in the core layer 16 may lead to the core layer 16 absorbing water, which may cause the wear layer 12, the decorative layer 14, and/or the backing layer 18 to warp.

In addition to or instead of including synthetic fibers, the substrate fibers may include cellulose fibers such as hemp fibers, cotton fibers, denim fibers, and/or paper fibers. The thermoplastic binder fibers may be bicomponent fibers with a core and a sheath surrounding the core. The core may be made of a first material, and the sheath may be made of a second material with a lower melting point than the first material. For example, the core may be made of PP or PET, and the sheath may be made of PE or co-PET.

In one example, the core layer 16 includes 48% of short PET fiber by weight, 9% of PP fiber by weight, 3% of nylon by weight, 30% of binder fiber by weight, and 10% of long PET fiber by weight. In other examples, the percentages by weight of the short PET fiber, the PP fiber, the nylon fiber, the binder fiber, and the long PET fiber may be within a range of +/−5%, +/−10%, or +/−20% relative to the above percentages. The length of the nylon fiber and the PET fiber may be within a range from 2 mm to 20 mm. The length of the short PET fiber may be within a range from 2 mm to 10 mm. The length of the long PET fiber may be within a range from 10 mm to 20 mm.

To manufacture the core layer 16, the various types of fibers discussed above are mixed to randomly distribute the thermoplastic binder fibers within the substrate fibers and thereby form a fiber mixture, and the fiber mixture is passed through a compression-type oven. The oven compresses the fiber mixture while heating the fiber mixture. As the oven heats the fiber mixture, the sheath of the bicomponent fiber melts and forms a coating covering most of the fibers in the mixture. After the fiber mixture exits the oven, the fiber mixture is cooled, and the melted sheath solidifies and binds the fibers together to form a fiber structure. The thermoplastic binder fibers may bind to one another to form a fiber matrix, and the substrate fibers may be captured within the fiber matrix to form the fiber structure. The fiber structure may be machined (e.g., cut) to form the core layer 16.

To ensure that the core layer 16 has a density within the density range discussed below, the percentages by weight of short PET fiber and binder fiber in the core layer 16 are greater than those of fiber structures that are less dense, such flooring underlayment. In addition, the amount of compression applied by the oven when making the core layer 16 is greater than the amount of compression applied by the oven when making less dense fiber structures. This may be accomplished by mixing together a greater amount of fiber than is mixed to make less dense fiber structures, and passing the fiber mixture through the oven at a desired minimal thickness. In one example, for a given volume, the amount of fiber used to make the core layer 16 is within a range from 40% to 60% greater than the amount of fiber used to make less dense fiber structures.

In one example, the core layer 16 has a compression resistance within a range from 450 pounds per square inch (psi) at 50% compression to 525 psi at 50% compression when tested according to American Society for Testing and Materials (ASTM) D3575. The compressibility of the core layer 16 may be achieved through the density and/or weight of the core layer 16. In one example, the core layer 16 has a density within a range from 10 pounds per cubic feet (lb./ft$^3$) to 40 lb./ft$^3$. In another example, the core layer 16 has a density within a range from 18 lb./ft$^3$ to 24 lb./ft$^3$. In yet another example, the core layer 16 has a weight from 1500 grams per square meter (GSM) to 5000 GSM.

In one example, the core layer 16 has an impact insulation class (IIC) within a range from 55 to 80, a sound transmission class (STC) within a range from 52 to 75, and/or a delta IIC within a range from 22 to 28. In one example, the core layer 16 has an R-value within a range from 0.6 to 0.9 or within a range from 3.5 to 4 per inch. While the core layer 16 is suitable for use in a floor covering having an underlayment backing, the sound reduction and thermal insulation provided by the core layer 16 eliminates the need to use a floor underlayment between the floor covering and the subfloor.

Referring now to FIG. 2, a floor structure 20 according to the present disclosure includes the multilayer flooring 10 installed on top of a flooring underlayment 22 and a subfloor 24. The flooring underlayment 22 is disposed between the multilayer flooring 10 and the subfloor 24. The flooring underlayment 22 compensates for imperfections in the subfloor 24 to provide a smooth and/or level surface, provides noise reduction, mitigates moisture damage to the multilayer flooring 10, and/or provides cushioning.

In some cases, the flooring underlayment 22 may be attached to the underside surface of the backing layer 18, or to the underside surface of the core layer 16 if the backing layer 18 is omitted. If the flooring underlayment 22 is attached to the underside surface of the core layer 16, the flooring underlayment 22 may make up the backing layer 18. The flooring underlayment 22 may be sheets of foam, cork, or felt. The flooring underlayment 22 has a thickness T6, which may be within a range from 3 mm to 6 mm.

The subfloor 24 is disposed below the flooring underlayment 22 and provides a flat and/or firm surface that supports the flooring underlayment 22 and the multilayer flooring 10. The subfloor 24 may be made of plywood or oriented strand board (OSB). The subfloor 24 has a thickness T6, which may be within a range of 12 mm to 16 mm.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the phrase at least one of A, B, and C should be construed to mean a logical (A OR B OR C), using a non-exclusive logical OR, and should not be construed to mean "at least one of A, at least one of B, and at least one of C." As used herein, the term "and/or" includes any and all combinations of one or more of the associated listed items.

What is claimed is:

1. A multilayer flooring comprising:
   a decorative layer configured to provide a desired appearance of the multilayer flooring; and
   a core layer disposed below the decorative layer and configured to provide stability, wherein the core layer is made of a substrate fiber bound together by a thermoplastic binder fiber, the substrate fiber including short polyethylene terephthalate (PET) fiber and long PET fiber, the short PET fiber having a length within a range from 2 millimeters (mm) to 10 mm, the long PET fiber having a length within a range from 10 mm to 20 mm, the short PET fiber making up between 38 percent and 58 percent by weight of the core layer.

2. The multilayer flooring of claim 1 wherein the short PET fiber makes up between 43 percent and 53 percent by weight of the core layer.

3. The multilayer flooring of claim 1 wherein the substrate fiber further includes polypropylene fiber and nylon fiber.

4. The multilayer flooring of claim 1 wherein the thickness of the multilayer flooring is within a range from 15 mm to 22 mm, and the decorative layer is made of wood, wood plastic composite, stone plastic composite, medium-density fiberboard, high-density fiberboard, or combinations thereof.

5. The multilayer flooring of claim 1 further comprising a wear layer disposed above the decorative layer configured to protect the multilayer flooring against at least one of scratches and stains.

6. The multilayer flooring of claim 5 wherein the thickness of the multilayer flooring is within a range from 6 mm to 12 mm, the decorative layer is made of paper, and the wear layer is made of aluminum oxide.

7. The multilayer flooring of claim 6 wherein the thickness of the multilayer flooring is within a range from 2 mm to 8 mm, the decorative layer is made of paper, and the wear layer is made of urethane.

8. The multilayer flooring of claim 1 further comprising a backing layer disposed below the core layer and configured to provide at least one of additional stability and water resistance.

9. The multilayer flooring of claim 8 wherein the backing layer is made of melamine, fiberglass, wood, wood plastic composite, stone plastic composite, medium-density fiberboard, high-density fiberboard, or combinations thereof.

10. A multilayer flooring comprising:
    a decorative layer configured to provide a desired appearance of the multilayer flooring; and
    a core layer disposed below the decorative layer and configured to provide stability, wherein the core layer is made of a substrate fiber bound together by a thermoplastic binder fiber, the substrate fiber including at least one of a cellulose fiber and a synthetic fiber, the thermoplastic binder fiber including a bicomponent fiber, the core layer having a density within a range from 10 pounds per cubic feet ($lb/ft^3$) to 40 $lb/ft^3$.

11. The multilayer flooring of claim 10 wherein the bicomponent fiber includes a core and a sheath surrounding the core, the core is made of polypropylene or PET, and the sheath is made of polyethylene or copolymerized PET.

12. A floor structure comprising:
    a multilayer flooring including:
      a decorative layer configured to provide a desired appearance of the multilayer flooring; and
      a core layer disposed below the decorative layer and configured to provide stability, wherein the core layer is made of a substrate fiber bound together by a thermoplastic binder fiber, the substrate fiber including at least one of a cellulose fiber and a thermoplastic fiber, the thermoplastic binder fiber including a bicomponent fiber; and
    a flooring underlayment configured to provide a smooth surface that supports the multilayer flooring, wherein the core layer is denser than the flooring underlayment.

13. The floor structure of claim 12 wherein, for a given volume, an amount of fiber in the core layer is within a range of 40 percent to 60 percent greater than the amount of fiber in the flooring underlayment.

14. The floor structure of claim 12 wherein the thickness of the multilayer flooring is within a range from 15 mm to 22 mm, and the decorative layer is made of wood, wood plastic composite, stone plastic composite, medium-density fiberboard, high-density fiberboard, or combinations thereof.

15. The floor structure of claim 12 wherein the multilayer flooring further includes a wear layer disposed above the decorative layer configured to protect the multilayer flooring against at least one of scratches and stains.

16. The floor structure of claim 15 wherein the thickness of the multilayer flooring is within a range from 6 mm to 12 mm, the decorative layer is made of paper, and the wear layer is made of aluminum oxide.

17. The floor structure of claim 15 wherein the thickness of the multilayer flooring is within a range from 2 mm to 8 mm, the decorative layer is made of paper, and the wear layer is made of urethane.

18. The floor structure of claim 12 wherein the multilayer flooring further includes a backing layer disposed below the core layer and configured to provide at least one of additional stability and water resistance, wherein the flooring underlayment is attached to an underside surface of the backing layer.

19. The floor structure of claim 18 wherein the backing layer is made of melamine, fiberglass, wood, wood plastic composite, stone plastic composite, medium-density fiberboard, high-density fiberboard, or combinations thereof.

\* \* \* \* \*